United States Patent
Liu

(10) Patent No.: US 9,352,943 B2
(45) Date of Patent: May 31, 2016

(54) LIFT MECHANISM FOR A GLASS SUBSTRATE IN AN EXPOSURE MACHINE

(71) Applicant: SHENZHEN CHINA STAR OPTOELECTRONICS TECHNOLOGY CO., LTD., Shenzhen, Guangdong (CN)

(72) Inventor: Xiaocheng Liu, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 142 days.

(21) Appl. No.: 14/112,943

(22) PCT Filed: Jun. 25, 2013

(86) PCT No.: PCT/CN2013/077840
§ 371 (c)(1),
(2) Date: Oct. 21, 2013

(87) PCT Pub. No.: WO2014/146365
PCT Pub. Date: Sep. 25, 2014

(65) Prior Publication Data
US 2014/0286735 A1  Sep. 25, 2014

(30) Foreign Application Priority Data
Mar. 19, 2013  (CN) ...................... 2013 2 0126319 U

(51) Int. Cl.
*B25B 11/00* (2006.01)
*B66F 7/00* (2006.01)
*G02F 1/13* (2006.01)
*G02F 1/1337* (2006.01)

(52) U.S. Cl.
CPC ................. *B66F 7/00* (2013.01); *B25B 11/005* (2013.01); *G02F 1/1303* (2013.01); *G02F 1/133788* (2013.01); *G02F 2001/133715* (2013.01)

(58) Field of Classification Search
CPC ..................................................... B25B 11/005
See application file for complete search history.

(56) References Cited

U.S. PATENT DOCUMENTS

| 2004/0001177 A1* | 1/2004 | Byun et al. ..................... 349/187 |
| 2008/0124198 A1* | 5/2008 | Kim et al. .................... 414/217.1 |
| 2015/0024147 A1* | 1/2015 | Lee et al. ....................... 427/569 |

FOREIGN PATENT DOCUMENTS

JP       2004029734 A  *  1/2004  ............... G02F 1/13

* cited by examiner

*Primary Examiner* — Gerald McClain

(57) ABSTRACT

A lift mechanism for a glass substrate in an exposure machine is provided, which comprises a base, a lift platform mounted on the top of the base and used to lift the glass substrate, lift bars mounted on the perimeter of the base, and at least one adsorbing devices mounted above the glass substrate; the lift bars are used to lift the perimeter of the glass substrate; each of the adsorbing devices is used to adsorb the upper surface of the substrate and able to move along the vertical direction and the horizontal direction.

5 Claims, 6 Drawing Sheets

LIFT MECHANISM FOR A GLASS SUBSTRATE IN AN EXPOSURE MACHINE

FIELD OF THE INVENTION

The present invention relates to the field of liquid crystal display, and more particularly, to a lift mechanism for a glass substrate in an exposure machine.

BACKGROUND OF THE INVENTION

HVA optically aligning technology refers to shine the glass substrate by the UV light (ultraviolet light) to enable the monomer reactions of the macromolecules in the glass substrate while applying a voltage to the glass substrate and heating the glass substrate by a lift platform, so as to realize the liquid crystal alignment.

In the prior art, the exposure machine lifts the glass substrate from down to up. Wherein, the perimeter of the glass substrate is lifted by the lift bars, and the middle of the glass substrate is lifted by the lift pins to prevent the middle of the glass substrate from being bended and deformed. Referring to FIGS. 1 and 2, a first lifting method in a common lift mechanism for a glass substrate in the exposure machine has been shown, in which the glass substrate is lifted as two parts. The lift mechanism for the glass substrate comprises a base 1, a lift platform 2 mounted on the top of the base 1, several lift bars 3 used for lifting the perimeter of the glass substrate 10, and lift pins 4. The lift pins 4 run through the base 1 and the lift platform 2 to lift the glass substrate 10. A group of lift pins 4 is provided in the lift mechanism for the glass substrate, and the group of lift pins 4 is used to lift the bisector of the glass substrate 10.

Referring to FIGS. 3 and 4, a second lifting method in a common lift mechanism for a glass substrate in the exposure machine has been shown, in which the glass substrate is lifted as three parts. Different from the first lift mechanism for the glass substrate in the exposure machine, the second lift mechanism for the glass substrate in the exposure machine is provided with two groups of lift pins 4, and each of the two series of lift pins 4 is used to lift a trisector of the glass substrate 10.

The temperature of the above lift mechanism for the glass substrate is heterogeneous due to its bad integrity, since the lift platform 2 has been divided into two or three. Thus, the HVA optically aligning effect of the glass substrate 10 will be influenced and the pin mura will appear and influence the quality of the product. Moreover, if the above lift mechanism for the glass substrate switches between the two lifting methods, the lift platform 2 must be changed, which may waste time and energy and influence the productive efficiency of the product.

SUMMARY OF THE INVENTION

The object of the present invention is to provide a lift mechanism for a glass substrate in an exposure machine, which has no influence to the HVA optically aligning effect of the glass substrate and is simple in operation, aiming at the drawbacks that the above lift mechanism for the glass substrate in the exposure machine has bad influence to the HVA optically aligning effect and consumes time and energy in the prior art.

The technical schemes to solve the above technical problems are as follows.

A lift mechanism for a glass substrate in an exposure machine is provided, which comprises a base, a lift platform mounted on the top of the base and used to lift the glass substrate, and lift bars mounted on the perimeter of the base, the lift bars are used to lift the perimeter of the bottom of the glass substrate; the lift mechanism for the glass substrate in the exposure machine further comprises at least one adsorbing devices mounted above the glass substrate; the adsorbing devices are used to adsorb the upper surface of the glass substrate and able to move along the vertical direction and the horizontal direction.

In the lift mechanism for a glass substrate in an exposure machine according to the present invention, there is one adsorbing device if the glass substrate is lifted as two parts.

In the lift mechanism for a glass substrate in an exposure machine according to the present invention, there are two adsorbing devices if the glass substrate is lifted as three parts.

In the lift mechanism for a glass substrate in an exposure machine according to the present invention, the adsorbing device comprises an adsorbing body, a vacuum chuck mounted on the bottom of the adsorbing body, and a driving device operable to control the adsorbing body to move synchronously in the vertical direction or the horizontal direction.

In the lift mechanism for a glass substrate in an exposure machine according to the present invention, the adsorbing device comprises at least one adsorbing body based on the size of the glass substrate.

In the lift mechanism for a glass substrate in an exposure machine according to the present invention, the vacuum chuck comprises a chuck body, a vacuum pump connected to the chuck body, and an electromagnetic valve connected to the vacuum pump; a sealing component is provided on the bottom of the chuck body.

In the lift mechanism for a glass substrate in an exposure machine according to the present invention, the adsorbing device further comprises a buffering part connected between the adsorbing body and the vacuum chuck.

In the lift mechanism for a glass substrate in an exposure machine according to the present invention, the buffering part is any one of a bounce cylinder, a spring and a soft cushion.

In the lift mechanism for a glass substrate in an exposure machine according to the present invention, each of the adsorbing devices is able to drive the glass substrate to move along the vertical direction.

In the lift mechanism for a glass substrate in an exposure machine according to the present invention, each of the adsorbing devices is able to separate from the glass substrate to move along the horizontal direction.

The following beneficial effects will be achieved when implementing the embodiments of the present invention. The lift mechanism for the glass substrate comprises a lift platform, and it has good integrality and uniform temperature, which is benefit for the HVA optically aligning of the glass substrate. Furthermore, the lift mechanism for the glass substrate comprises the adsorbing device, as a result, the switch between the two-part lift method and the three-part lift method will be simple and with high working efficiency.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENTS

To make the technical features, objects and effects more clearly, the present invention may be further described in detail with reference to the accompanying drawings and embodiments.

Figure 1:
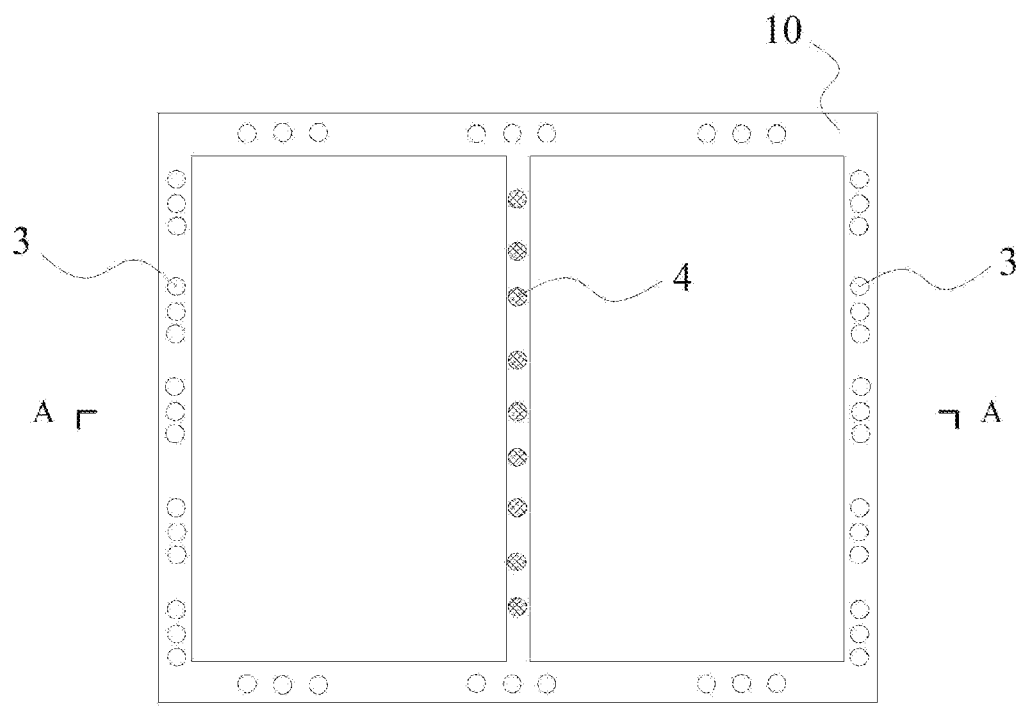
FIG. 1 is a planar diagram for a lift mechanism for a glass substrate in an exposure machine with a first lifting method in the prior art.
Figure 2:
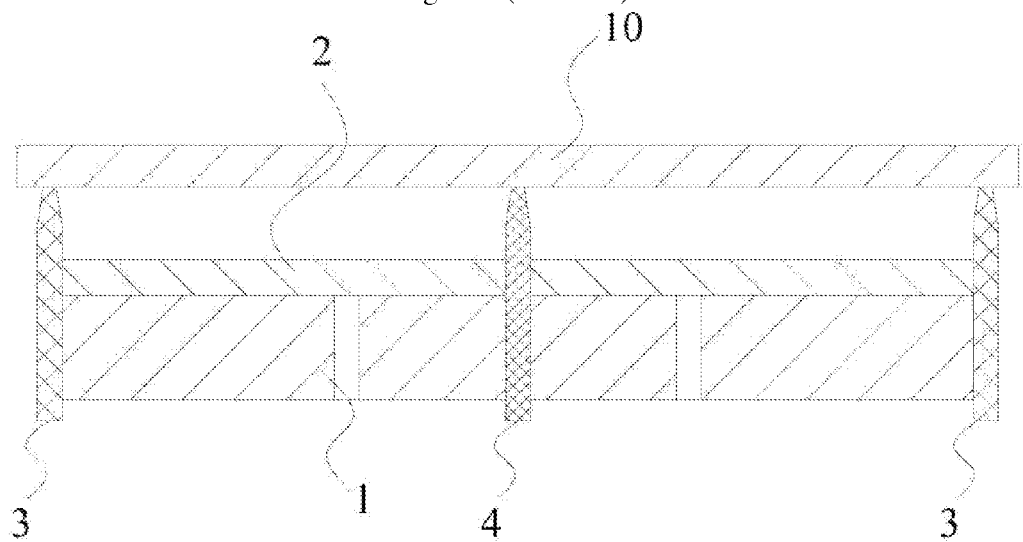
FIG. 2 is a profile diagram for the lift mechanism for a glass substrate in an exposure machine with the first lifting method shown in FIG. 1 along line A-A.
Figure 3:
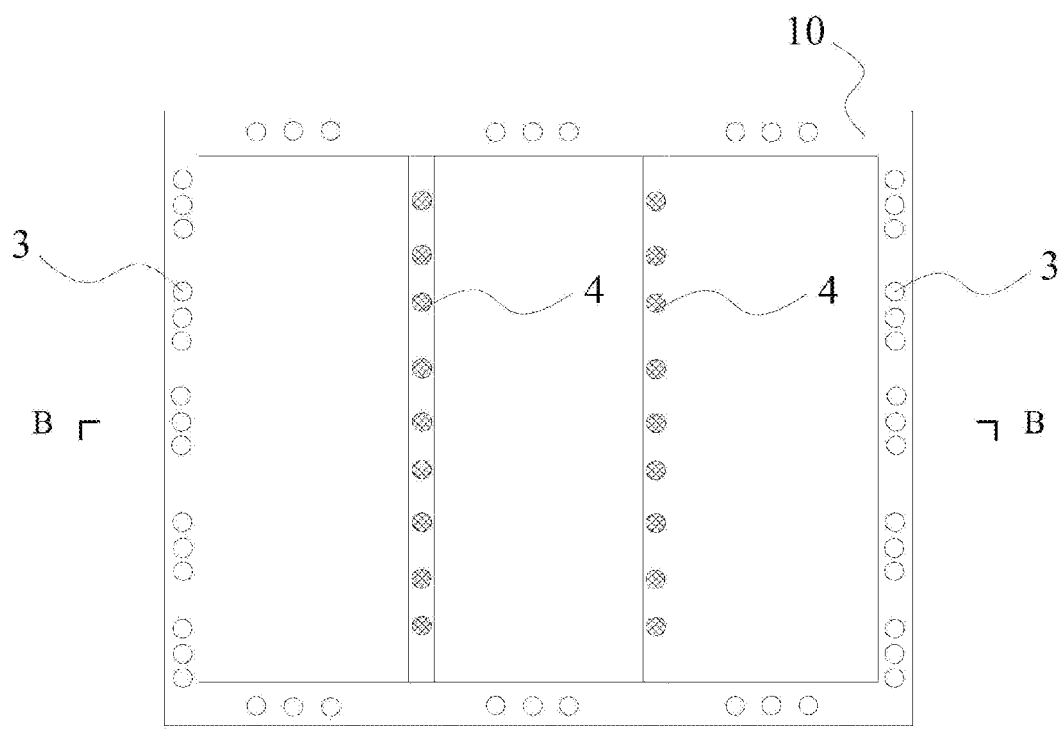
FIG. 3 is a planar diagram for a lift mechanism for a glass substrate in an exposure machine with a second lifting method in the prior art.
Figure 4:
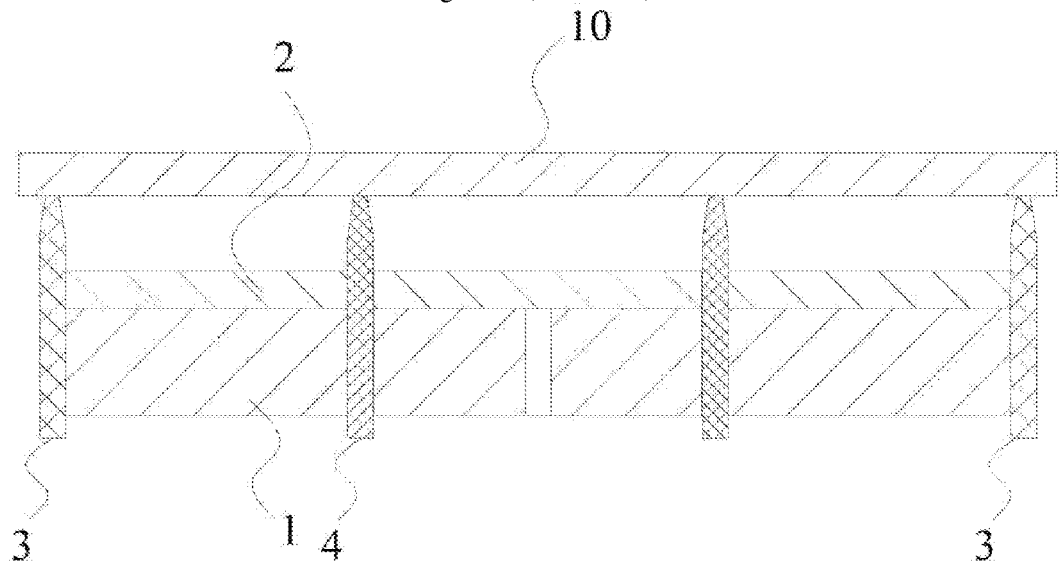
FIG. 4 is a profile diagram for the lift mechanism for a glass substrate in an exposure machine with the second lifting method shown in FIG. 3 along line B-B.
Figure 5:
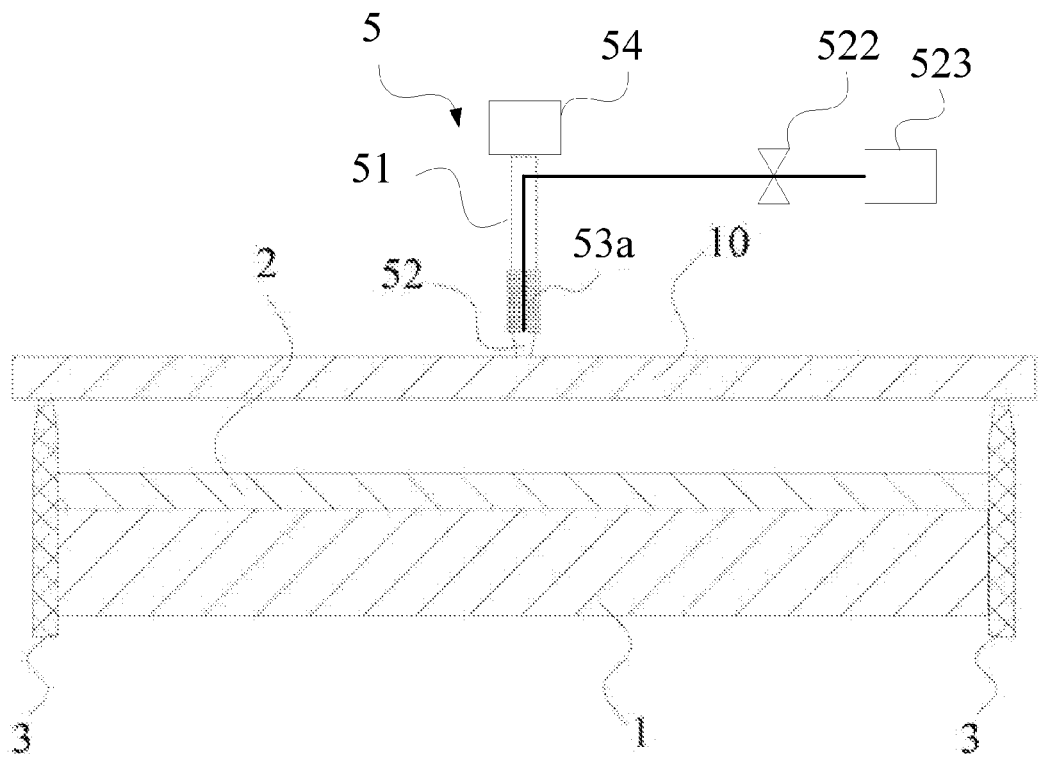
FIG. 5 is a structural diagram for a lift mechanism for a glass substrate in an exposure machine according to a first preferred embodiment of the present invention, wherein the lift bars and the adsorbing device are lifting the glass substrate.
Figure 6:
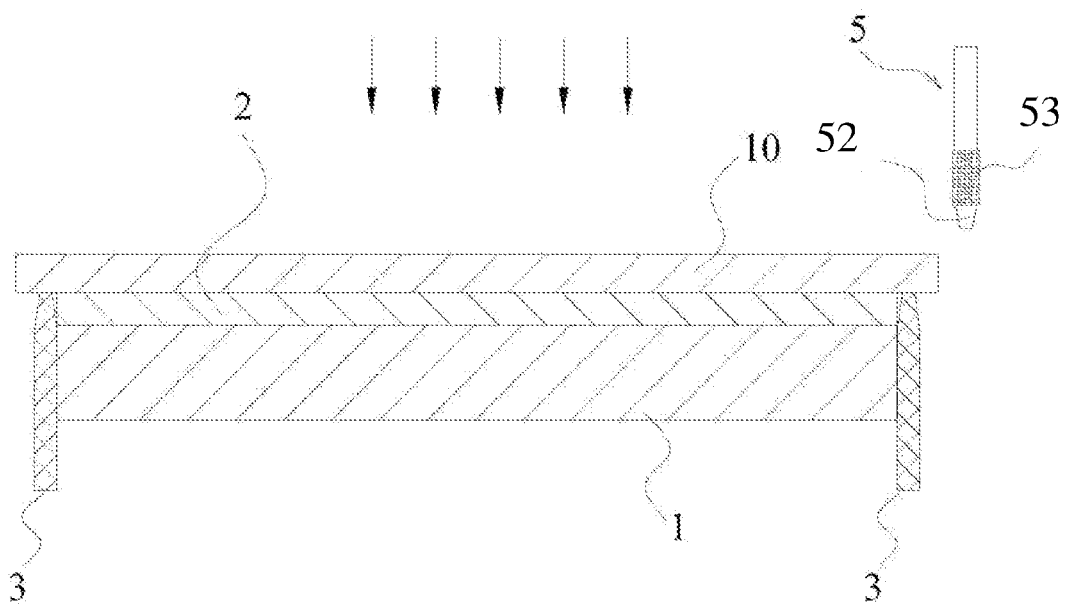
FIG. 6 is a structural diagram for the lift mechanism for the glass substrate in the exposure machine shown in FIG. 5 wherein the adsorbing device is moving away.

Referring to FIGS. 5 and 6, in the first preferred embodiment of the present invention, a lift mechanism for a glass substrate in an exposure machine is provided. The lift mechanism comprises a base 1, a lift platform 2, lift bars 3 and at least one adsorbing devices 5. The lift platform is substantially square and mounted on the top of the base 1. When the glass substrate 10 is shined by the UV light (ultraviolet light), the lift platform 2 is used to lift the glass substrate 10. The lift platform 2 has an integral solid structure and the integrality of it is good. Thus, during the process of HVA optically aligning, the temperature of the platform 2 is uniform, which will benefit for the HVA optically aligning of the glass substrate 10 to improve the quality of the product.

There are several lift bars 3 that are mounted on the perimeter of the base 1 and used to lift the perimeter of the bottom of the glass substrate 10. When picking and placing the glass substrate 10, the lift bars 3 will move upward to lift the glass substrate 10 up. Meanwhile, the adsorbing device 5 is adsorbed to the upper surface of the glass substrate 10. The lift bars 3 and the adsorbing device 5 lift and clamp the glass substrate 10 together. The glass substrate 10 can be driven by the lift bars 3 and adsorbing device 5 to move up and down in the vertical direction, so as to prevent the glass substrate 10 from being bended and deformed at its center. The adsorbing device 5 can move in the horizontal direction as well. Referring to FIG. 6, when the glass substrate 10 is shined under the UV light, the adsorbing device 5 will be moved apart from the glass substrate 10 to a side of the glass substrate 10 so as to avoid the UV light (ultraviolet light) from being sheltered.

The adsorbing device 5 is mounted above the glass substrate 10. In the embodiment, the glass substrate 10 is lifted as two parts. There is one adsorbing device 5 which comprises at least one adsorbing body 51, vacuum chuck 52 and a driving device (not shown). The adsorbing body 51 is substantially rod-shaped and several adsorbing bodies 51 are arranged in a line evenly. Each of the adsorbing bodies 51 is provided with a vacuum chuck 52 at the bottom. Each of the adsorbing bodies 51 is mounted on the driving device, and they are driven by the driving device to move synchronously in the vertical direction or in the horizontal direction.

In the embodiment, the driving device comprises a horizontal guide rail, a horizontal threaded rod, a horizontal motor, a vertical guide rail, a vertical threaded rod and a vertical motor. The horizontal threaded rod is connected to and driven by the output shaft of the horizontal motor. The vertical guide rail is mounted on the horizontal threaded rod and movably mounted on the horizontal guide rail. Thus, the vertical guide rail can be controlled to move along the horizontal guide rail by controlling the operation of the horizontal motor. The vertical threaded rod is connected to and driven by the output shaft of the vertical motor. Each adsorbing body 51 is mounted on the horizontal threaded rod and movably mounted on the vertical guide rail. Thus, each adsorbing body 51 can be controlled to move along the vertical guide rail by controlling the operation of the vertical motor. Moreover, a tradition controller can be used to control the rotating speed of the vertical motor to make each adsorbing body 51 and the lifting bars 3 move synchronously, namely to make the rising or falling speed of the adsorbing body 51 and the lift bars 3 in the vertical direction equal.

In the embodiment, each vacuum chuck 52 is adsorbed to the bisector on the surface of the glass substrate 10. The vacuum chuck 52 comprises a chuck body (not shown), a vacuum pump (not shown) connected to the chuck body and an electromagnetic valve (not shown) connected to the vacuum pump. The bottom of the chuck body is provided with a sealing component. When the vacuum chuck 52 is demanded to adsorb the glass substrate 10, the vacuum pump will be controlled by the electromagnetic valve to extract the air between the sealing component and the glass substrate 10 to form a vacuum space, so as to make the sealing component to rest against the glass substrate 10 instead of dropping away. The sealing component is made of rubber, which may make little damage to the surface of the workpiece. When the vacuum chuck 52 is demanded to be taken apart from the glass substrate 10, the vacuum pump will be controlled by the electromagnetic valve to discharge the air to separate the vacuum chuck 52 from the glass substrate 10. In the embodiment, the adsorbing device 5 is provided with nine adsorbing bodies 51 and nine vacuum chucks 52 accordingly. The nine vacuum chucks 52 are arranged in a line with equal distance. It should be understood that there are other options for the amount of adsorbing body 51 in the adsorbing device 5 based on the glass substrates 10 of different sizes.

In the embodiment, in order to prevent the adsorbing device 5 from crushing the glass substrate 10 due to the oversize impact force when the adsorbing device 5 is moving downward vertically, the adsorbing device 5 further comprises a buffering part 53. The buffering part 53 is connected between the adsorbing body 51 and the vacuum chuck 52. When the adsorbing device 5 is contacted with the glass substrate 10, the buffering part 53 can play a role of buffering to avoid the glass substrate 10 from being broken down. In the embodiment, the buffering part 53 may be a bounce cylinder, a spring, or a soft cushion and so on. When the traditional bounce cylinder is adopted, the impact due to the inertia when the plunger of the bounce cylinder is stopping at the end of the stroke can be absorbed to prevent the glass substrate 10 from being damaged. The spring has good flexibility and is able to absorb the impact force produced from the movement of the adsorbing device 5, and thus avoiding the glass substrate 10 from being damaged. The soft cushion is made of foamed material and also has good flexibility, so the soft cushion can play a role of buffering to prevent the glass substrate 10 from being damaged effectively.

Figure 7:
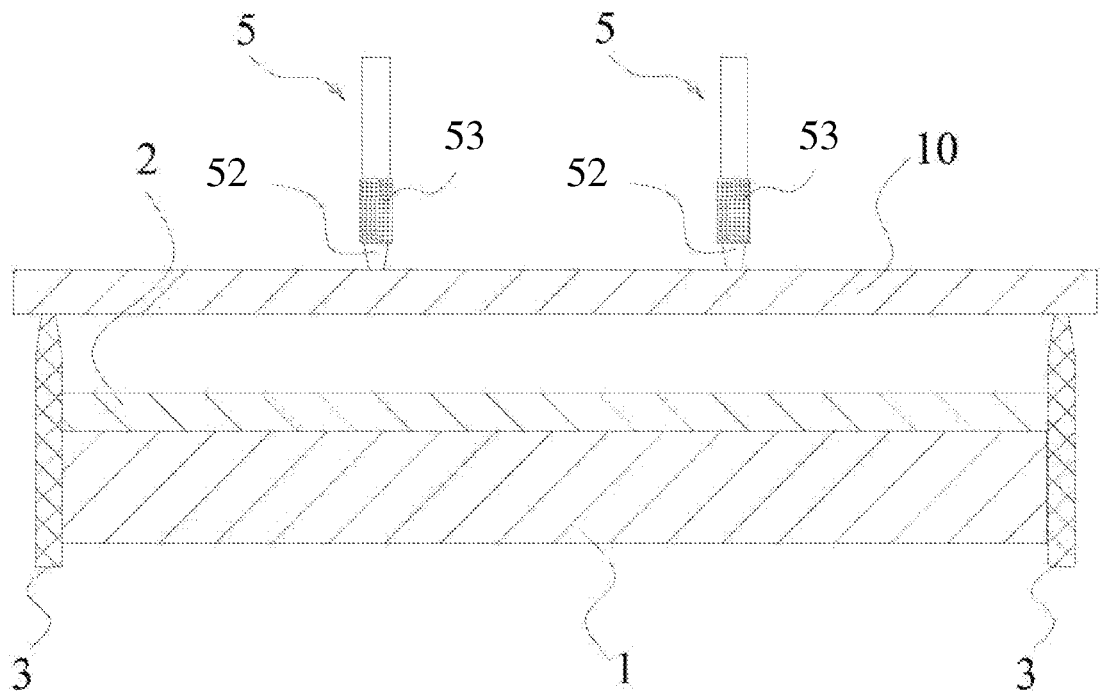
FIG. 7 is a structural diagram for a lift mechanism for a glass substrate in an exposure machine according to a second preferred embodiment of the present invention, wherein the lift bars and the adsorbing device are lifting the glass substrate.
Figure 8:
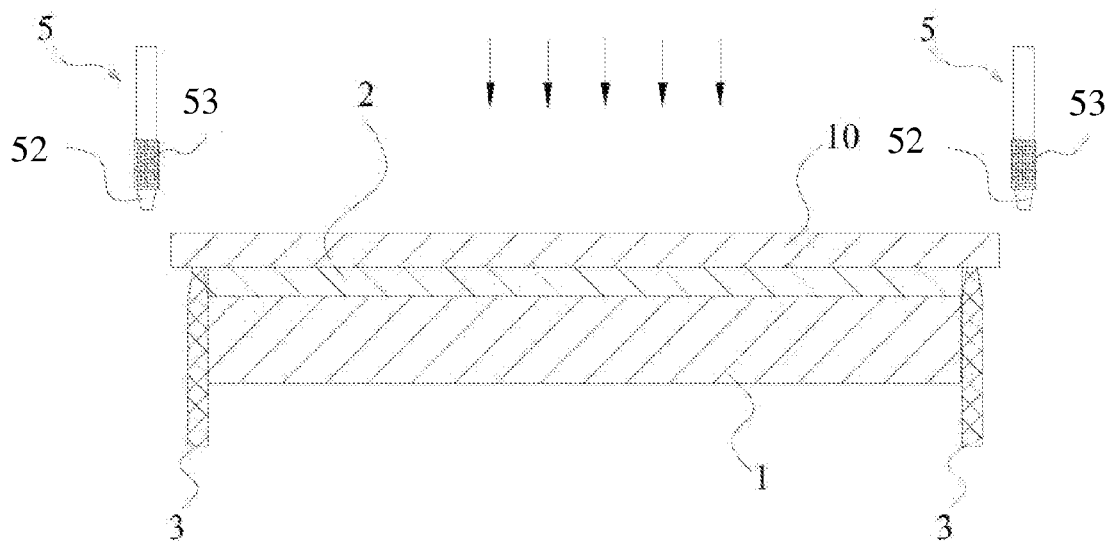
FIG. 8 is a structural diagram for the lift mechanism for the glass substrate in the exposure machine shown in FIG. 7 wherein the adsorbing device is moving away.
Figure 9:
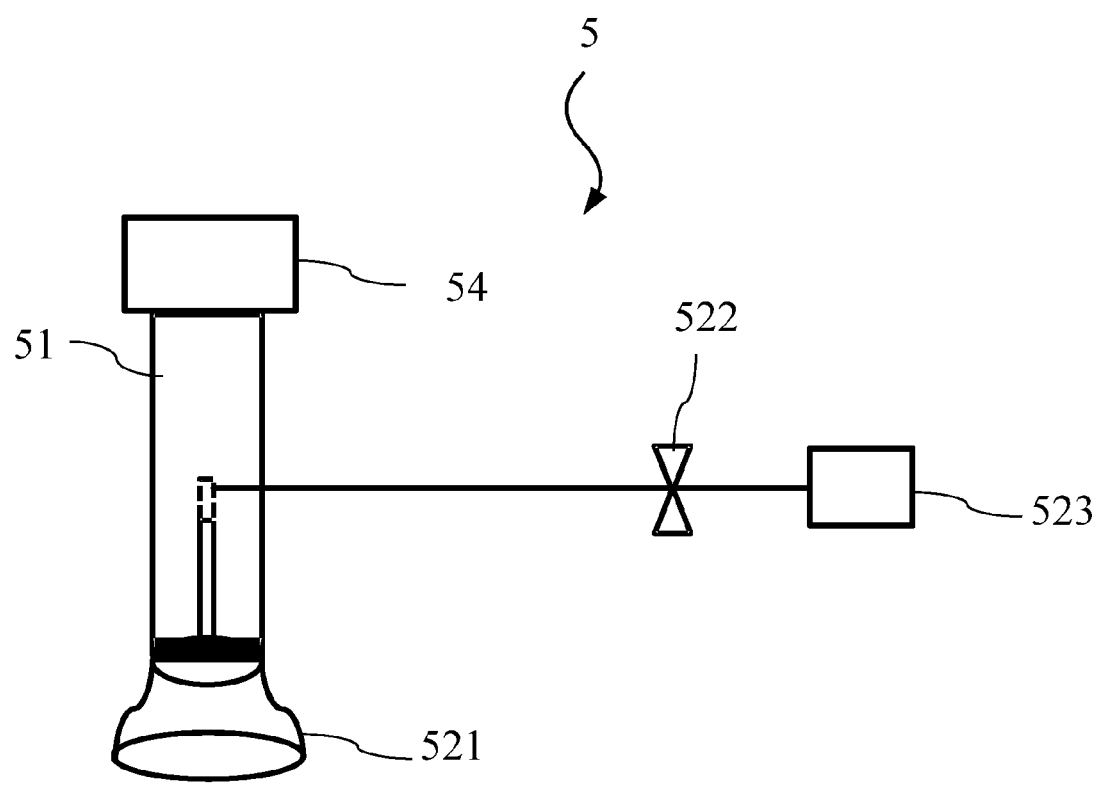
FIG. 9 is a structural diagram of an absorbing device according to a first embodiment of the present invention.
Figure 10:
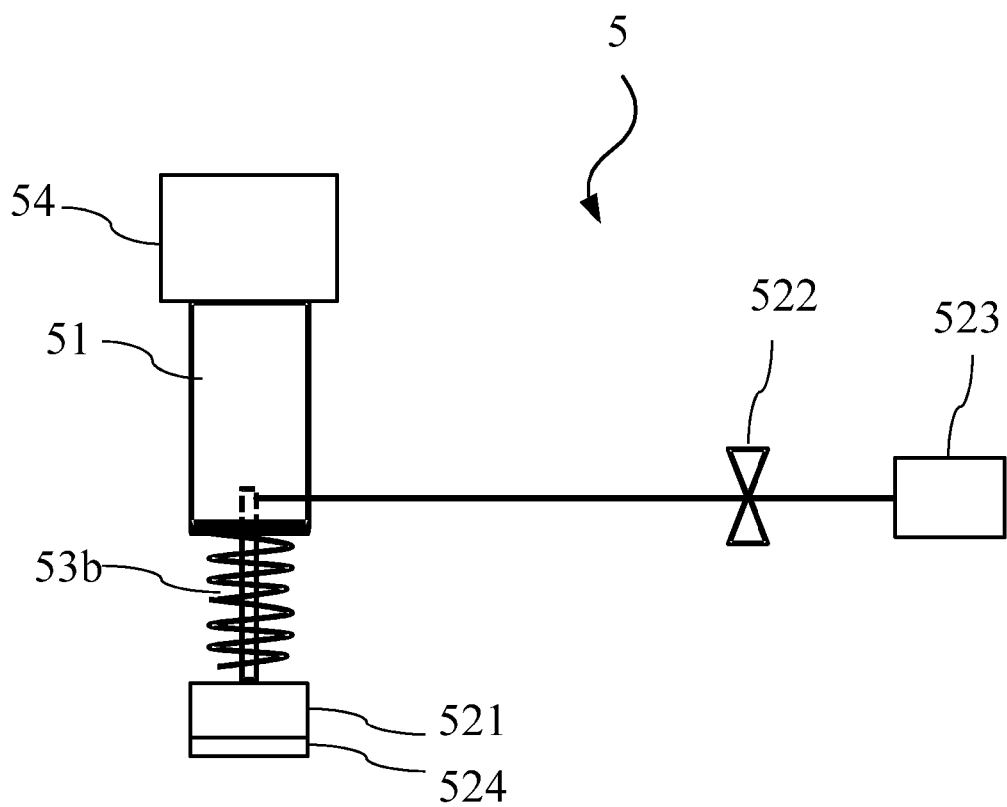
FIG. 10 is a structural diagram of an absorbing device according to a second embodiment of the present invention.

Referring to FIGS. 7 and 8, in a second preferred embodiment of the present invention, a lift mechanism for a glass substrate in an exposure machine is provided. Different from the first preferred embodiment, in the second preferred embodiment, the glass substrate 10 is lifted as three parts and there are two adsorbing devices 5. The vacuum chucks 52 in the two adsorbing devices 5 are adsorbed to the trisectors on the surface of the glass substrate 10 respectively. Referring to FIG. 8, when the glass substrate 10 is shined by the UV light (ultraviolet light), the two adsorbing devices 5 will be moved to two sides of the glass substrate 10 so as to avoid the UV light (ultraviolet light) from being sheltered. With two adsorbing devices 5, one of the adsorbing devices 5 can be controlled to be adsorbed to the bisector on the surface of the glass substrate 10, or both of them can be controlled to be adsorbed to the trisectors on the surface of the glass substrate 10 respectively. The lift mechanism for the glass substrate can switch between the two-part lift method and the three-part lift method simply and with high working efficiency.

While the embodiments of the present invention have been described with reference to the drawings, the present invention will not be limited to above embodiments that are illustrative but not limitative. It will be understood by those skilled in the art that various changes and equivalents may be substituted in the light of the present invention without departing from the spirit and scope of the present invention, and those various changes and equivalents shall fall into the protection of the invention.

The invention claimed is:

1. A lift mechanism for a glass substrate in an exposure machine, comprising
   a base,
   a support platform fixed on the top of the base and used to support the glass substrate, and
   lift bars mounted on the perimeter of the base and used to lift the perimeter of the bottom of the glass substrate, and
   two adsorbing devices that are (1) mounted above two trisectors of the glass substrate respectively and (2) separated from each other and working independently from each other such that they both translate horizontally away from each other;
   wherein each of the adsorbing devices is used to adsorb the upper surface of the glass substrate and able to move along the vertical direction and the horizontal direction;
   and wherein the adsorbing device comprises
      an adsorbing body,
      a vacuum chuck mounted on the bottom of the adsorbing body,
      a driving device operable to control the adsorbing body to move synchronously in the vertical direction or the horizontal direction, and
      a buffering part connected between the adsorbing body and the vacuum chuck; wherein the buffering part is provided to avoid the glass substrate from being broken down due to the oversize impact force when the absorbing device is moving downward vertically;
      wherein the vacuum chuck comprises a chuck body, a vacuum pump connected to the chuck body, and an electromagnetic valve connected to the vacuum pump; a sealing component made of rubber is provided on the bottom of the chuck body.

2. The lift mechanism for the glass substrate in the exposure machine according to claim 1, wherein the adsorbing device comprises at least one adsorbing body based on the size of the glass substrate.

3. The lift mechanism for the glass substrate in the exposure machine according to claim 1, wherein the buffering part is a spring or a soft cushion.

4. The lift mechanism for the glass substrate in the exposure machine according to claim 1, wherein each of the adsorbing devices is able to drive the glass substrate to move along the vertical direction.

5. The lift mechanism for the glass substrate in the exposure machine according to claim 1, wherein each of the adsorbing devices is able to separate from the glass substrate to move along the horizontal direction.

\* \* \* \* \*